United States Patent
Dorion et al.

(10) Patent No.: US 9,615,586 B2
(45) Date of Patent: Apr. 11, 2017

(54) FOOD CUTTER WITH DECORATIVE PATTERN PRESS

(71) Applicant: Francis I Acquisition Corp., Garden City, NY (US)

(72) Inventors: Christopher M. Dorion, Elmhurst, IL (US); Zhe Shen, Palatine, IL (US); William A. Bucklew, Wilmette, IL (US)

(73) Assignee: LIFETIME BRANDS, INC., Garden City, NY (US)

( * ) Notice: Subject to any disclaimer, the term of this patent is extended or adjusted under 35 U.S.C. 154(b) by 0 days.

(21) Appl. No.: 14/457,395

(22) Filed: Aug. 12, 2014

(65) Prior Publication Data
US 2016/0044928 A1 Feb. 18, 2016

(51) Int. Cl.
*A21C 11/10* (2006.01)
*A21C 15/04* (2006.01)

(52) U.S. Cl.
CPC ............ *A21C 11/106* (2013.01); *A21C 15/04* (2013.01)

(58) Field of Classification Search
CPC .............................. A21C 11/006; A21C 11/106
See application file for complete search history.

(56) References Cited

U.S. PATENT DOCUMENTS

| | | | |
|---|---|---|---|
| 177,319 A | 5/1876 | Blaul | |
| 2,791,960 A | 5/1957 | Pietropinto | |
| 4,384,838 A | 5/1983 | Laughlin | |
| 4,424,601 A | 1/1984 | Weber | |
| D282,893 S | 3/1986 | Daenen | |
| 6,010,325 A * | 1/2000 | Lawrence | A21C 11/006 425/364 R |
| 7,331,776 B2 | 2/2008 | Errera | |
| 8,230,604 B1 | 7/2012 | Corey et al. | |
| 2004/0040443 A1 | 3/2004 | Errera | |
| 2004/0249059 A1 | 12/2004 | Akbar et al. | |
| 2012/0231105 A1 | 9/2012 | Palazzolo | |
| 2012/0280106 A1 | 11/2012 | Mills | |

FOREIGN PATENT DOCUMENTS

GB 2423051 A 8/2006
JP 2008-154943 A 7/2008

OTHER PUBLICATIONS

Espacenet English translation of Abstract of JP 2008-154943.

* cited by examiner

*Primary Examiner* — Ryan Ochylski
(74) *Attorney, Agent, or Firm* — Tutunjian & Bitetto, P.C.

(57) ABSTRACT

A food cutter has a cutting portion and a movable portion that is movable between a first position in which the movable portion is raised relative to the cutting portion and a second position in which the movable position is lowered relative to the cutting portion. The cutting portion comprises an upstanding wall with a blade formed on a distal end of the upstanding wall. The movable portion is arranged generally traverse to the upstanding wall. A biasing member extends continuously from the upstanding wall to the movable portion. The biasing member urges the movable portion to the first position when the movable portion is moved to the second position.

16 Claims, 3 Drawing Sheets

FOOD CUTTER WITH DECORATIVE PATTERN PRESS

BACKGROUND AND SUMMARY

This disclosure relates to a food cutter. In particular, the disclosure relates to a dough cutter, for instance, cookie dough or pastry dough, although other soft food substances may be cut with a food cutter as described herein. The cutter has a cutting portion and a movable portion. The movable portion is movable between a first position in which the movable portion is raised relative to the cutting portion and a second position in which the movable portion is lowered relative to the cutting portion. The cutting portion comprises an upstanding wall with a blade formed on a distal end of the upstanding wall. The movable portion is arranged generally transverse to the upstanding wall. A biasing member urges the movable portion to the first position when the movable portion is moved to the second position. The biasing member extends continuously from cutting portion to the movable portion.

DETAILED DESCRIPTION

Figure 1:
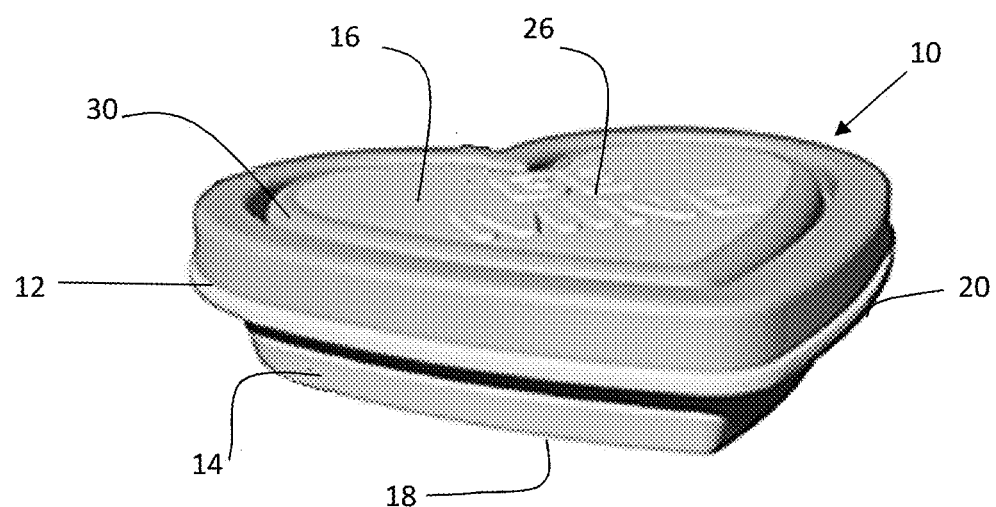
FIG. 1 shows a perspective view of a food cutter.

FIG. 1 shows a food cutter 10. The food cutter has a cutting portion 12 comprising an upstanding wall 14 and a movable portion 16. The upstanding wall 14 may define a generally close curve shape with the moveable portion 16 arranged within the closed curve shape. The closed curve shape may be continuous such that the upstanding wall has no openings along the closed curve shape, or the upstanding wall may have points of opening that in gross nonetheless define a closed curve shape. The upstanding wall may also have an open shape with opposing portions and the moveable member arranged between opposed portions. The upstanding wall is preferably formed from a generally rigid material. The upstanding wall may be made from a non-stick plastic material such as poly propylene or acrylonitrile butadiene styrene (ABS). The upstanding wall has a distal end with a cutting blade 18 for cutting the food substance, for instance, dough. The upstanding wall may have a ledge 20 that projects outwardly from the upstanding wall to allow the user the ability to handle the cutter.

Figure 2:
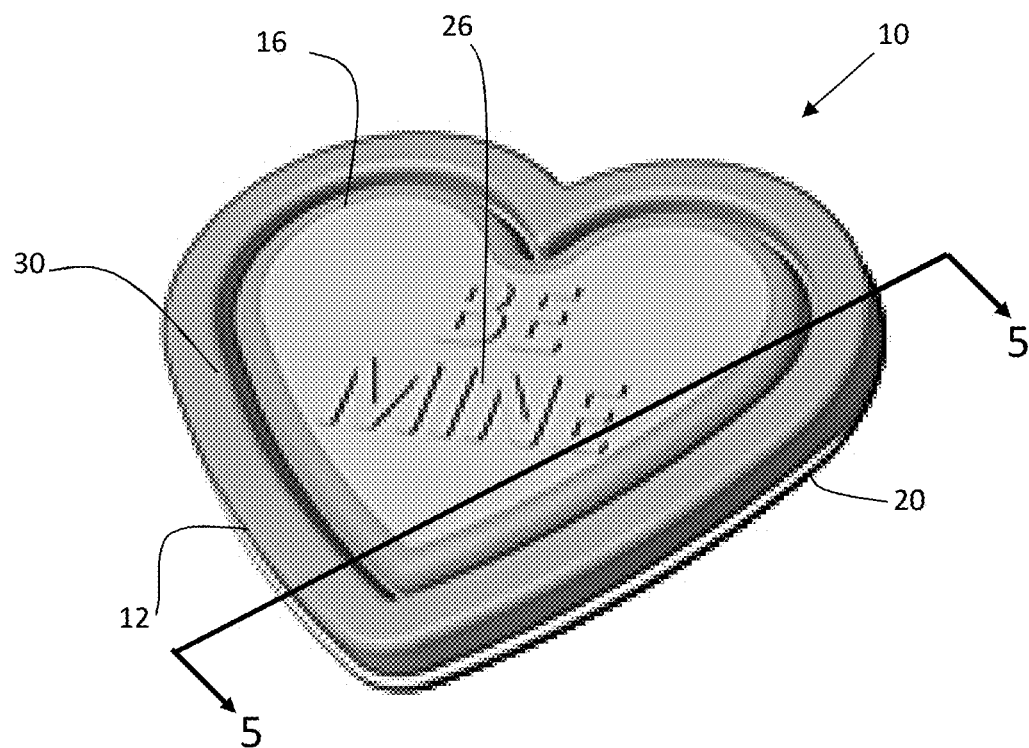
FIG. 2 shows an alternate perspective view of the food cutter of FIG. 1 with a movable portion in a first or raised position relative to a cutting portion.
Figure 3:
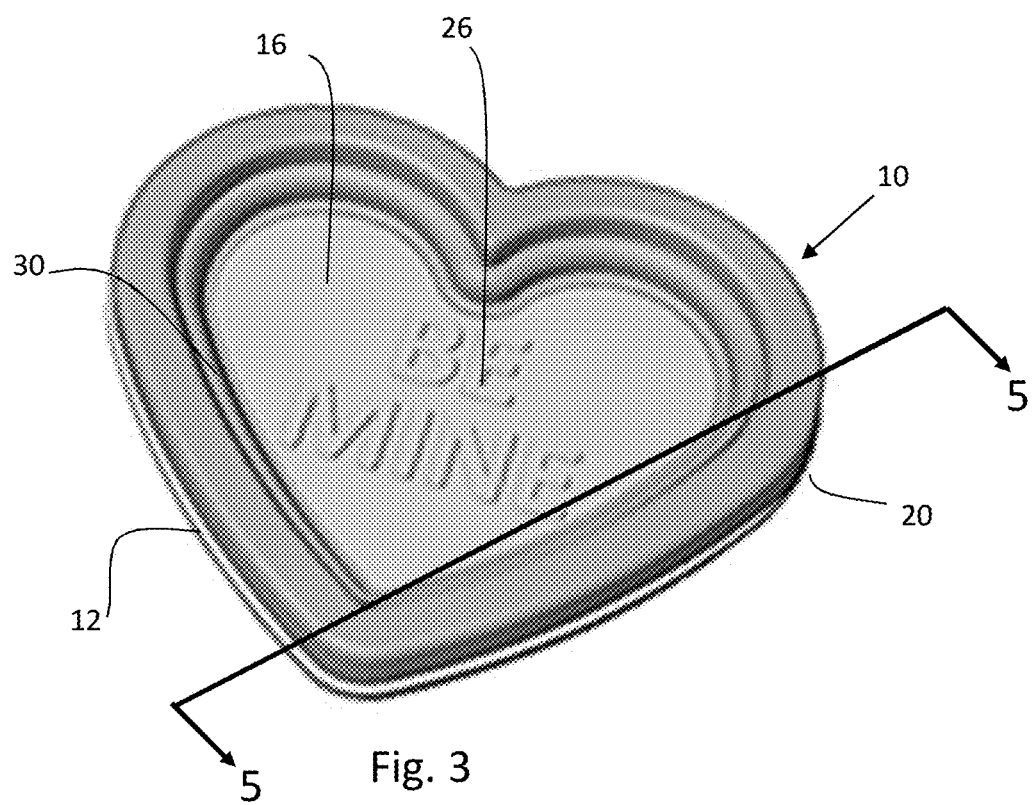
FIG. 3 shows an alternate perspective view of the food cutter of FIG. 1 with the movable portion in a second or lowered position relative to the cutting portion.

The movable portion 16 is generally perpendicular or transverse to the upstanding wall 14. The movable portion may be movable between a raised position (FIG. 2) and a lowered position (FIG. 3). The movable portion generally moves in a perpendicular fashion relative to the upstanding wall. The movable portion is preferably formed from a generally rigid material. The movable portion may be made from a plastic nonstick material such as poly propylene or ABS.

Figure 4:
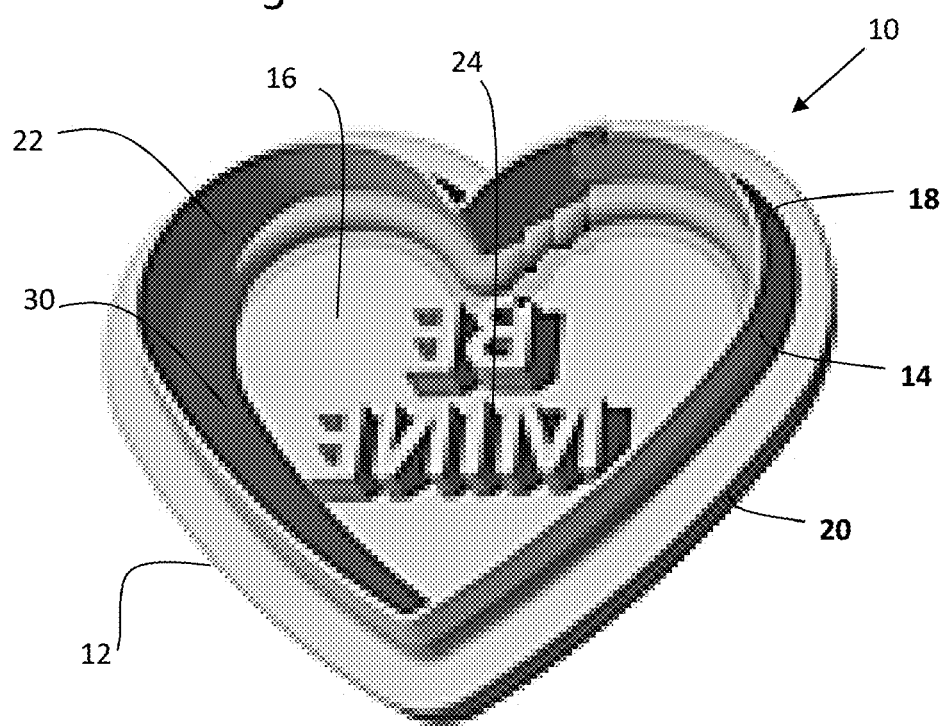
FIG. 4 shows an alternate perspective view of the food cutter of FIG. 1 providing a view of a cavity defined by the movable portion and the cutting portion.

The upstanding wall 14 and the movable portion 16 generally define a cavity 22 (FIG. 4) for the cutter 10. The interior surfaces of the upstanding wall 14 may be smooth and without inclusions or other inset features thereby allowing the movable portion 16 to be moved in the cavity 22 without obstruction while allowing the food substance, for instance, dough, to be easily extracted from the cavity. The cavity 22 is formed to eliminate included areas that would otherwise trap the food substance and prevent the cutter from operating as desired. FIG. 4 shows an interior view of the cavity. The cavity is generally smooth without inclusions to allow the cut the food substance into a desired shape that may be removed from the cutter without deformation.

The movable portion 16 may comprise a decorative pattern stamp 24 (FIG. 4). As shown in the drawings, an outer or exposed surface of the movable portion may have indicia 26 representative of or indicating the style or type of decorative pattern stamp. In the alternative, the movable portion 16 may be formed without a decorative pattern. The movable portion may be used to allow the user to extract the food substance from the cutter once cut by depressing the movable portion downward to the lower portion.

A biasing member 30 may connect the movable portion 16 to the cutting portion 12. The biasing member 30 preferably extends from the edges of the movable portion 16 to the cutting portion 12. For instance, when the cutting portion upstanding wall 14 generally defines as a closed curve (with or without openings), the biasing member 30 may extend from the upstanding wall continuously around the close curve shape to an outer periphery of the movable portion 16. Other configurations may also be used. For instance, the upstanding wall may define an open shape with opposing wall portions. The movable member may be arranged between opposing wall portions and the biasing member may have a first portion connecting one edge of the movable portion to one upstanding wall portion and another portion connecting another edge of the movable portion another upstanding wall portion. In each case, the biasing member extends continuously from the movable member to the upstanding wall so as to prevent the food substance from being deposited in unwanted locations in the cavity. The biasing member 30 is shaped to prevent the food substance from being trapped in unwanted areas in the cavity thereby reducing the potential for deformation of the stamped food substance. The biasing member biases the movable portion towards the raised portion when movable portion is moved toward the second position. In this way, the movable portion spring returns to the raised position. Preferably, the biasing member is made from non-stick, flexible, material such as silicone or thermoplastic elastomer (TPE) material. As shown in the drawings (FIGS. 5 and 6), the biasing member 30 may comprising a live hinge. The live hinge may be configured to enable the movable portion to be urged towards the raised position. The live hinge may extend continuously around the upstanding wall and outer periphery of the movable member.

Figure 5:
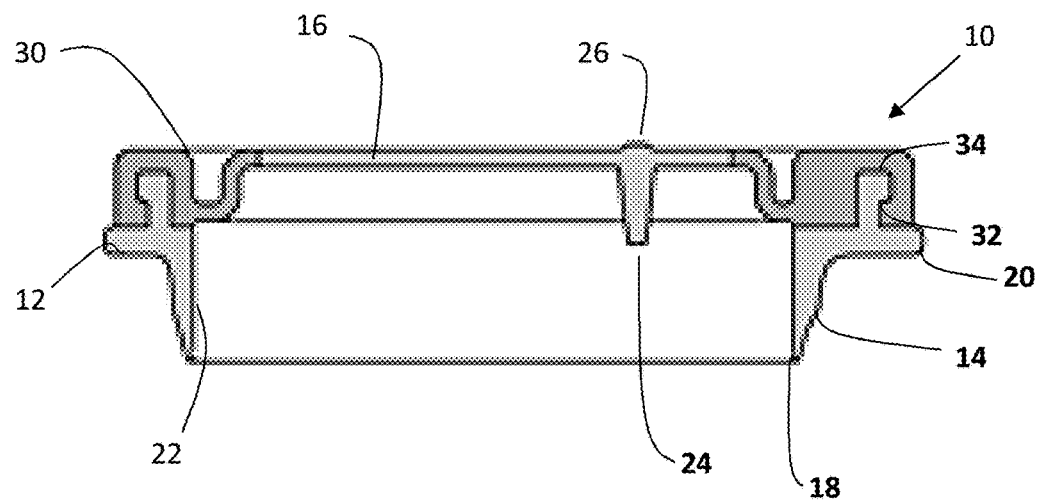
FIG. 5 is a cross-sectional view of the cutter taken along lines 5-5 of FIG. 2.
Figure 6:
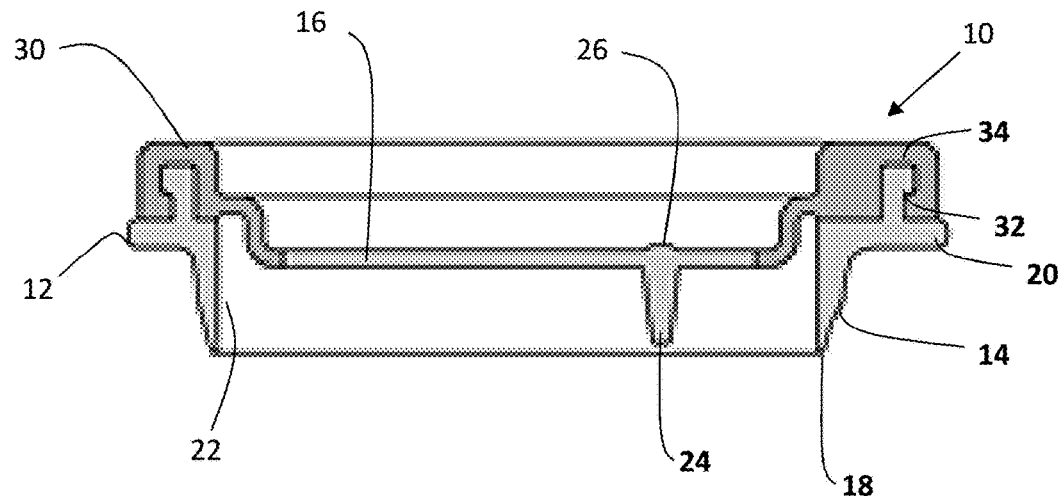
FIG. 6 is a cross-sectional view of the cutter taken along lines 6-6 of FIG. 3.

As best shown in FIGS. 5 and 6, the biasing member 30 may extend from the movable portion 16 to the cutting portion 12 over the top of the upstanding wall 14. The biasing member may interlock with the upstanding wall to form the upstanding wall, the biasing member, and the movable portion as an integral, one-piece unit. As shown in the drawings, the upstanding wall may have a flange 32 that cooperates with a groove 34 formed in the biasing member 30. The biasing member 30 may extend over the upstanding wall in such a fashion to engage the flange. The biasing member 30 may extend over the top of the upstanding wall and abut the ledge.

In operation of the food cutter, a user may grasp the cutter around the ledge and operate the movable portion with his or her thumb applying the needed pressure to form the food substance with the cutter and to actuate the decorative pattern stamp as needed. The user can direct the needed pressure to the movable portion to control the decorative pattern stamp and produce the desired decorative the food substance, e.g., cookie.

In view of the foregoing, it will be seen that the several advantages are achieved and attained. The embodiments were chosen and described in order to best explain a practical application to thereby enable others skilled in the art to best utilize the principles herein in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A food cutter comprising:
   a cutting portion and a movable portion being movable between a first position in which the movable portion is raised relative to the cutting portion and a second position in which the movable portion is lowered relative to the cutting portion, the cutting portion comprising an upstanding wall with a blade formed on a distal end of the upstanding wall, the movable portion being arranged traverse to the upstanding wall, said upstanding wall having an outwardly projecting ledge; and
   a biasing member extending continuously from the cutting portion to the movable portion abutting the outward projecting ledge, the biasing member urging the movable portion to the first position when the movable portion is moved to the second position.

2. The food cutter of claim 1, wherein the upstanding wall defines a closed curve.

3. The food cutter of claim 1, wherein the moveable portion comprises a decorative pattern stamp.

4. The food cutter of claim 3, wherein indicia representative of the decorative pattern stamp are visible on an exposed surface of the movable portion.

5. The food cutter of claim 1, wherein the movable portion, the biasing member, and the cutting portion are integrally formed.

6. The food cutter of claim 1, wherein the biasing member extends over a proximal end of the upstanding wall.

7. The food cutter of claim 6, wherein the proximal end of the upstanding wall interlocks with the biasing member.

8. The food cutter of claim 7, wherein the proximal end has a flange that cooperates with a groove formed in the biasing member.

9. A food cutter comprising:
   a cutting portion and a movable portion being movable between a first position in which the movable portion is raised relative to the cutting portion and a second position in which the movable portion is lowered relative to the cutting portion, the cutting portion comprising an upstanding wall having a blade formed on a distal end of thereof, the movable portion being arranged traverse to the upstanding wall, said upstanding wall having an outwardly projecting ledge; and
   a biasing member abutting the outwardly protecting ledge and urging the movable portion to the first position when the movable portion is moved to the second position, the movable portion having an outer periphery and the biasing member extending continuously from the movable portion outer periphery to the upstanding wall.

10. The food cutter of claim 9, wherein the upstanding wall defines a closed curve.

11. The food cutter of claim 9, wherein the moveable portion comprises a decorative pattern stamp.

12. The food cutter of claim 11, wherein indicia representative of the decorative pattern stamp are visible on an exposed surface of the movable portion.

13. The food cutter of claim 9, wherein the movable portion, the biasing member, and the cutting portion are integrally formed.

14. The food cutter of claim 9, wherein the biasing member extends over a proximal end of the upstanding wall.

15. The food cutter of claim 14, wherein the proximal end of the upstanding wall interlocks with the biasing member.

16. The food cutter of claim 15, wherein the proximal end has a flange that cooperates with a groove formed in the biasing member.

* * * * *